(12) United States Patent
Biber

(10) Patent No.: US 12,517,202 B2
(45) Date of Patent: Jan. 6, 2026

(54) MAGNETIC RESONANCE SYSTEM HAVING A HEAT STORAGE FACILITY IN THE OUTER VACUUM CHAMBER

(71) Applicant: Siemens Healthineers AG, Forchheim (DE)

(72) Inventor: Stephan Biber, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 139 days.

(21) Appl. No.: 18/521,124

(22) Filed: Nov. 28, 2023

(65) Prior Publication Data
US 2024/0201293 A1    Jun. 20, 2024

(30) Foreign Application Priority Data

Dec. 15, 2022  (EP) ..................................... 22213918

(51) Int. Cl.
*G01R 33/38*     (2006.01)
*G01R 33/3815*   (2006.01)

(52) U.S. Cl.
CPC ..... *G01R 33/3815* (2013.01); *G01R 33/3804* (2013.01)

(58) Field of Classification Search
CPC .......................... G01R 33/3804; G01R 33/00; G01R 33/3815; G01R 33/0035; G01R 33/0023; G01R 33/0017; G01R 31/3191; G01B 7/004; G01C 17/38; H01L 39/223
See application file for complete search history.

(56) References Cited

U.S. PATENT DOCUMENTS

| | | |
|---|---|---|
| 6,977,571 B1 | 12/2005 | Hollis et al. |
| 2011/0007445 A1 | 1/2011 | Blakes |
| 2011/0056218 A1 | 3/2011 | Blakes |
| 2014/0085021 A1* | 3/2014 | Blakes ...................... H01F 6/02 335/216 |
| 2015/0255977 A1 | 9/2015 | Jonas et al. |
| 2015/0346299 A1* | 12/2015 | Pourrahimi ........ G01R 33/3815 324/319 |
| 2018/0267119 A1 | 9/2018 | Chen et al. |
| 2021/0239257 A1* | 8/2021 | Stautner .................. F16L 59/18 |

FOREIGN PATENT DOCUMENTS

DE   112016000535 T5   11/2017
GB      2420858 A       6/2006

* cited by examiner

*Primary Examiner* — Lee E Rodak
*Assistant Examiner* — Taqi R Nasir
(74) *Attorney, Agent, or Firm* — Banner & Witcoff, Ltd.

(57) ABSTRACT

Techniques are provided for cooling a magnetic resonance system in a cost-effective and space-saving manner. For this purpose, a magnetic resonance system is proposed which has a superconducting magnetic coil facility, an outer vacuum chamber in which the superconducting magnetic coil facility is arranged, and a first load facility for ramping down the superconducting magnetic coil facility. An electric current is introduced from the magnetic coil facility into the load facility, and the first load facility is arranged within the outer vacuum chamber.

19 Claims, 2 Drawing Sheets

MAGNETIC RESONANCE SYSTEM HAVING A HEAT STORAGE FACILITY IN THE OUTER VACUUM CHAMBER

CROSS-REFERENCE TO RELATED APPLICATIONS

The present application claims priority to and the benefit of European patent application no. EP 22213918.0, filed on Dec. 15, 2022, the contents of which are incorporated herein by reference in their entirety.

TECHNICAL FIELD

The present disclosure relates to a magnetic resonance system having a superconducting magnetic coil facility, an outer vacuum chamber in which the superconducting magnetic coil facility is arranged, and a load facility for ramping down the superconducting magnetic oil facility, wherein electric current is introduced from the magnetic coil facility into the load facility. Furthermore, the present disclosure relates to a method for operating such a magnetic resonance system.

BACKGROUND

Modern magnetic resonance systems (MR systems for short) are usually produced as "dry MR systems" with a low helium content to save costs and become independent of helium. For this purpose, it is essential that dry MR magnets can ramp themselves down (i.e. decouple current to reduce the magnetic field) in the event of a power or cooling failure to prevent a so-called "quench" (transition of the superconductor from the superconducting—to the normally—conducting state as a result of exceeding the transition temperature). When ramped down, the energy stored in the magnetic field is conducted out of the magnet and released as heat. In particular, the energy is not deposited within the cryoshield (the so-called "4 K level"), where it would take much longer to extract the energy again. Instead, the energy is transferred to a heat storage facility, which is located outside the magnet or outside the outer vacuum chamber (OVC). For this purpose, the current, which initially flows without resistance in the superconductor, is guided out of the magnet and conducted via line diodes/resistors to transfer the magnetic or electrical energy in the form of thermal energy to a load facility (RDL: run down load). The load facility can be made of inexpensive material having a high heat capacity (for example aluminum) or as a "hybrid heat storage facility" (the material undergoes a phase transition when storing heat, for example paraffin).

For magnets with increasing field strength (>1.5 T), however, aluminum storage facilities are relatively large and heavy. In the case of 3 T magnets, 200 to 300 kg aluminum, for example, would be required to receive the energy of the field (8 to 15 MJ) and simultaneously to maintain the temperature of the load facility (RDL: run down load) below 70° C. (the critical contact temperature for service technicians).

These large aluminum masses are disadvantageous because they demand a large amount of space on the magnet, which is required for the electronic system. Transportation is also difficult due to the increased weight. For reasons of accessibility, the mass must as a rule be distributed asymmetrically, which can lead to altered dynamic vibration behavior (floor born vibrations).

A cold head for an MRT system for cooling the superconducting magnetic coils is described, for example, in German publication DE 11 2016 000 535 T5.

SUMMARY

The object of the present disclosure is thus to create an improved way of dissipating energy from superconducting coils of a magnetic resonance system.

In accordance with the disclosure, this object is achieved by a magnetic resonance system having a superconducting magnetic coil device, wherein the magnetic resonance system has an outer vacuum chamber in which the superconducting magnetic resonance facility (e.g. referred to as the field magnet or main magnet) is arranged. The magnetic resonance system can be designed, for example, as a magnetic resonance tomography unit. The magnetic resonance system, and in particular the main magnet, has superconducting magnetic coils, for example, to be able to produce field strengths of more than 1.5 T with a comparatively low energy outlay. For this purpose, the superconducting magnetic coils must be cooled for example to 4 K. For this purpose, the superconducting magnetic coils are usually located in a so-called cryoshield, which for its part is arranged in an outer vacuum chamber (OVC). A vacuum is usually provided between the outer vacuum chamber and the cryoshield to largely prevent heat transfer from the outside to the inside to the cooled, superconducting magnetic coils.

Furthermore, the magnetic resonance system has a first load facility for ramping down the superconducting magnetic coil facility, wherein electrical current is introduced from the superconducting magnetic coil facility into the first load facility (also referred to herein simply as a load).

The first load facility usually has multiple diodes or resistors with which the current flowing into the superconducting magnetic coils can be converted into heat. This means that when ramped down, the current is deliberately directed out of the superconducting magnetic coils of the superconducting magnetic coil facility to reduce the magnetic field and to remove the energy from the magnetic coil facility. Ramping down or running down corresponds therefore to running down the superconducting magnetic coil facility, wherein the magnetic field is completely or partially switched off. The superconducting magnetic coil facility usually also has a heat storage facility that receives and stores the heat produced by the diodes or resistors. However, the heat can also be transferred directly to the housing of the outer vacuum chamber if necessary.

In accordance with the disclosure, the first load facility is arranged at least in part within the outer vacuum chamber. This means, for example, that the entire first load facility is located between the cryoshield and vacuum chamber in the vacuum. Optionally, however, the diode or resistor arrangement, for example, can also be arranged inside the vacuum chamber (OVC) and the first heat storage unit of the first load facility can be arranged outside on the wall of the vacuum chamber. In this case, the heat from the diode or resistor arrangement can penetrate the wall of the vacuum chamber (OVC) to the first heat storage unit. By virtue of the fact that the first load facility is arranged at least partially within the outer vacuum chamber, less space is required for the first load facility outside as a result of which the entire magnetic resonance system can be constructed in a more compact manner.

In one exemplary embodiment, it is provided that the first load facility is connected to a cold head via a thermal conductor, which is used for cooling the superconducting magnetic facility. Such a cold head is known, for example, from DE 11 2016 000 535 A1. A first stage of the cold head can cool the first load facility between the outer vacuum chamber and the cryoshield. For this purpose, a first stage of the cold head can be connected or thermally coupled via the thermal conductor to the first load facility. It is possible, using the second stage of the cold head, to cool the superconducting magnetic coils within the cryoshield to 4 K, for example, Consequently, the cold head, which is actually used for cooling the superconducting magnetic coils, can also be used for cooling the first load facility, for example, to 50 K. Thermal insulation towards the inside can be improved by reducing the mechanical connections towards the inside (in other words towards the cryoshield). A further improvement of the thermal isolation can be achieved by providing the cryoshield with a sheath and/or the outer vacuum chamber with a film or a structure having less infrared emissivity to reduce the radiation of heat.

In accordance with a further exemplary embodiment, the superconducting magnetic facility is arranged, as just described, in a cryoshield within the outer vacuum chamber. The cold head protrudes through the outer vacuum chamber and through the cryoshield, and the first load facility is connected to the cold head between the outer vacuum chamber and the cryoshield via the thermal conductor. It is possible, using the cryoshield and the outer vacuum chamber, to essentially shield three temperature zones from one another, namely an outer temperature zone at approx. 300 K, a middle temperature zone between the outer vacuum chamber and the cryoshield in the region of 50 K, and an inner temperature zone within the cryoshield at approx. 4 K for the superconductivity.

In a further exemplary embodiment, the magnetic resonance system has a thermal switch in the thermal conductor, wherein it is possible using the thermal switch to control heat dissipation of the thermal conductor. The thermal conductor thermally couples the first load facility and the cold head. If the thermal switch were not provided, it would not be possible to precisely control the cooling of the first load facility. It is possible, with the aid of the thermal switch, to switch the cooling of the first load facility on or off. It may even be possible using the thermal switch to adjust intermediate states of the thermal conductivity of the thermal conductor. This renders it possible to also regulate the quality of the cooling. The thermal switch renders it possible, for example, when the magnetic resonance system is ramped up, initially to cool the components, which are essential for superconducting, namely the superconducting magnetic coils, and subsequently, where appropriate, further components such as e.g. the first load facility (RDL).

In a further exemplary embodiment, it is provided that the first load facility has a first diode arrangement and/or first resistor arrangement, and a first heat storage unit for receiving thermal energy from the first diode arrangement and/or first resistor arrangement. The first load facility is therefore an electrical load that converts electrical current from the superconducting magnetic coil facility into heat. For example, diodes and/or resistors are suitable for this purpose. The first load facility can thus have, for example, a plurality of diodes and/or resistors which are provided in appropriate arrangements. The first heat storage unit can be formed, for example, entirely or in part from copper or aluminum. These metals have a comparatively high heat capacity. Consequently, the first load facility not only converts the generated current into heat, but also stores this heat. The first heat storage unit can be arranged outside on the OVC.

In another exemplary embodiment, the magnetic resonance system has, in addition to the first load facility within the outer vacuum chamber, a second load facility outside the outer vacuum chamber, wherein the second load facility is also configured so as to ramp down the superconducting magnetic coil facility in that electrical current from the superconducting magnetic coil facility is introduced into the second load facility. This means that, in this case, it is not only possible to introduce the electrical current of the superconducting magnetic coils into the first load facility, but also into the second load facility. For example, both load facilities can be operated simultaneously or alternatively. In principle, each individual load facility is suitable so as to render it possible to ramp down the superconducting magnetic coil facility, although this could take a correspondingly long time.

If both load facilities are used simultaneously, ramping down can occur quicker. The fact that the load facilities are arranged in different temperature zones (outside and inside the outer vacuum chamber) means that the load facilities themselves can be cooled differently. This variance also increases reliability.

In an embodiment, it is possible to provide the second load facility having a second diode arrangement and/or second resistor arrangement, and also a second heat storage unit for receiving thermal energy from the second diode arrangement and/or the second resistor arrangement, wherein the second heat storage unit is connected to a separate cooling system than the first load facility. The second load facility can be constructed in the same manner as the first load facility. However, it is generally sufficient to design the second heat storage unit for example as a cooling plate. This can be cooled efficiently by the separate cooling system. In this case, the cooling medium, for example, flows through or past the second heat storage unit.

In a still further exemplary embodiment, it is possible to provide that the first and second load facility are connected via a switching facility (also referred to herein as a switch) to superconducting magnetic coils of the superconducting magnetic coil facility so that, depending upon the switching state of the switching facility, current of the superconducting magnetic coils can be introduced into the first and/or second load facility. This switching facility can have a superconducting switch. The switching facility is able, for example, to switch current from 500 to 700 A. If necessary, the switching facility is also able to divide the current between the two load facilities. The switching facility naturally also has a switching state in which no current is discharged from the superconducting magnetic coils.

Furthermore, it is possible to provide that the first heat storage unit has a material which has at least one phase transition in a temperature range, which is predetermined within the outer vacuum chamber. If, for example, the first heat storage facility is filled with liquid nitrogen, the phase transition of the nitrogen can be used for additional heat absorption. If solid nitrogen is used for the heat storage facility, it is even possible to use two phase transitions in the case of approx. 63 K and 77 K to absorb additional energy.

In accordance with a further exemplary embodiment, it is provided that the first load facility is fastened directly to the outer vacuum chamber. The first load facility can also be supported mechanically on the outer vacuum chamber. In so doing, it is advantageous to design the heat transfer of the support or rather fastening as efficiently as possible so that the first load facility can, where appropriate, also dissipate heat directly to the outer vacuum chamber or its wall. Where reference is made in this document to the "outer vacuum chamber," this generally refers to the wall of this vacuum chamber.

In a further exemplary embodiment, the magnetic resonance system has within the outer vacuum chamber a cooling circuit, and the first load facility is connected thereto for cooling. The cooling circuit can be used, for example, to transport heat from the first load facility to the cold head. A suitable cooling medium is to be selected that is liquid in the temperature zone of approx. 50 K.

In the case of a further exemplary embodiment, the magnetic resonance system has a control facility (also referred to herein as a controller) that only sets the cooling circuit into operation if the first load facility is used for the ramping down. This means that the first load facility is not constantly cooled via the cooling circuit. As a consequence, it is possible to reduce the energy consumption for a pump and its disruption potential. The control facility is only able to put the cooling circuit into operation when the magnetic coil device is to be ramped down and, in particular, only when the first load facility is also used for ramping down.

The object mentioned above is also achieved in accordance with the disclosure by a method for operating a magnetic resonance system, which has a superconducting magnetic coil facility, an outer vacuum chamber in which the superconducting magnetic coil facility is arranged, and a first load facility for ramping down the superconducting magnetic coil facility, wherein electrical current within the outer vacuum chamber is introduced from the magnetic coil facility into the first load facility.

The advantages and variation possibilities mentioned in connection with the magnetic resonance system illustrated above also apply mutatis mutandis for the method in accordance with the disclosure. In this case, the aforementioned functional characteristics of the magnetic resonance system correspond to the corresponding method features.

For application cases or application situations that may arise during the method and that are not explicitly described here, it is possible to provide in accordance with the method that an error message and/or a request to enter a user feedback is output and/or a standard setting and/or a predetermined initial state is set.

BRIEF DESCRIPTION OF THE DRAWINGS

The present disclosure is now explained with reference to the attached figures. In the drawings.

DETAILED DESCRIPTION OF THE DISCLOSURE

The exemplary embodiments described in more detail below represent example embodiments of the present disclosure.

Figure 1:
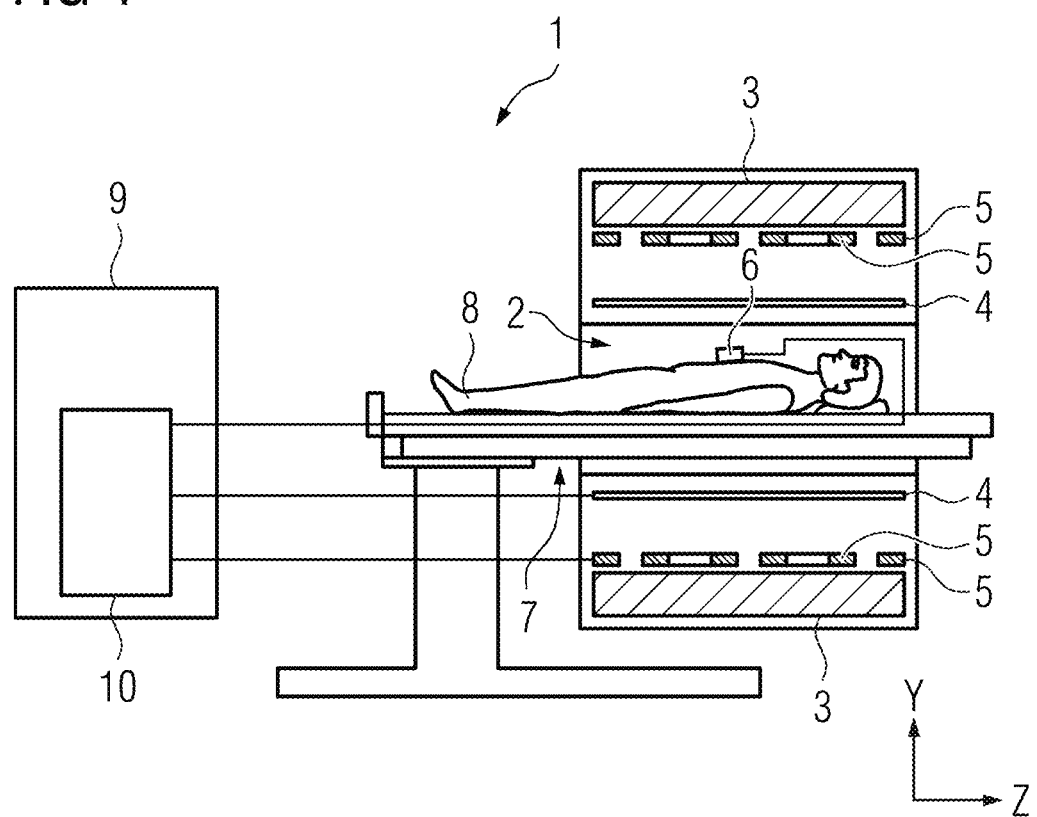
FIG. 1 illustrates a schematic view of an example magnetic resonance system, in accordance with one or more embodiments of the present disclosure.

FIG. 1 illustrates a schematic view of an example magnetic resonance system, in accordance with one or more embodiments of the present disclosure. FIG. 1 may represent a schematic view of an exemplary embodiment of an MRT or magnetic resonance system 1 in accordance with the disclosure.

The MRT system 1 comprises a magnet unit (also referred to herein as a main magnet) having a field magnet that generates a static magnetic field so as to align nuclear spins of an object 8, for example a patient, in an imaging area. The imaging area is characterized by an extremely homogenous static magnetic field, wherein the homogeneity relates in particular to the magnetic field strength or to its amplitude. The imaging area is located in a patient tunnel 2, which extends in a lengthwise direction Z through the magnet unit 10. The field magnet can be, for example, a superconducting magnet that can generate magnetic fields with a magnetic flux density of up to 3 T or more. However, it is also possible for lower field strengths to also use permanent magnets or electromagnets with normally conductive coils. A patient table 7 can be movable within the patient tunnel 2.

Furthermore, the magnet unit comprises a gradient coil arrangement 5 having multiple gradient coils, which are used to superimpose gradient fields on the static magnetic field, in other words position-dependent magnetic fields, in the three spatial directions so as to spatially differentiate between the scanned image areas in the imaging area. The gradient coils of the gradient coil arrangement 5 can be designed, for example, as coils of normally conductive wires which can generate, for example, mutually orthogonal fields or field gradients in the imaging area.

The magnet unit comprises a transmitter coil arrangement which can comprise, for example, a body coil 4 as a transmitting antenna which is designed so as to transmit a radiofrequency (RF) signal into the imaging area. The body coil 4 can therefore be understood as a RF transmitter coil arrangement of the MRT system 1 or as part of the RF transmitter coil arrangement. The body coil 4 can also be used in some embodiments so as to receive resonant MR signals which are emitted by the object 8. In this case, the body coil 4 can also be regarded as part of a signal detection apparatus of the MRT system 1. Optionally, the signal detection apparatus comprises a local coil apparatus 6, which can be arranged in the immediate vicinity of the object 8, for example on the object 8 or in the patient table 7. The local coil apparatus 6 can be used as an alternative or in addition to the body coil 4 as a receiving coil or receiving antenna.

The MRT system 1 also comprises a control and computing system 9. The control and computing system 9 can comprise a transceiver control unit 10, which is connected to the body coil 4, the gradient coil arrangement 5, and/or the local coil 6. In dependence upon the detected MR signals, the transceiver control unit 10, which can comprise an analog-to-digital converter, ADC, can generate corresponding MR data, e.g. in k-space. Where appropriate, the transceiver control unit 10 is also connected to the body coil 4 and controls the body coil 4 so as to generate RF pulses, such as excitation pulses and/or refocusing pulses. Furthermore, the transceiver control unit 10 of the control and computing system 9 can also be connected to the gradient coil arrangement 5 and control the gradient coil arrangement 5 to switch layer selection gradients, gradients for the frequency coding, and/or phase coding and/or read-out gradients.

A computer of the control and computing system 9 can evaluate the MR data and may, for example, assume image reconstruction or parts thereof or other computing tasks that are necessary with regard to imaging. It is to be noted that the described structure of the control and computing system 9 represent a non-limiting example. The different required tasks and functions can also be distributed differently and/or to different control units and/or other computing units.

The MRT system 1 is able for example to perform a method in accordance with the disclosure for operating a magnetic resonance system.

Figure 2:
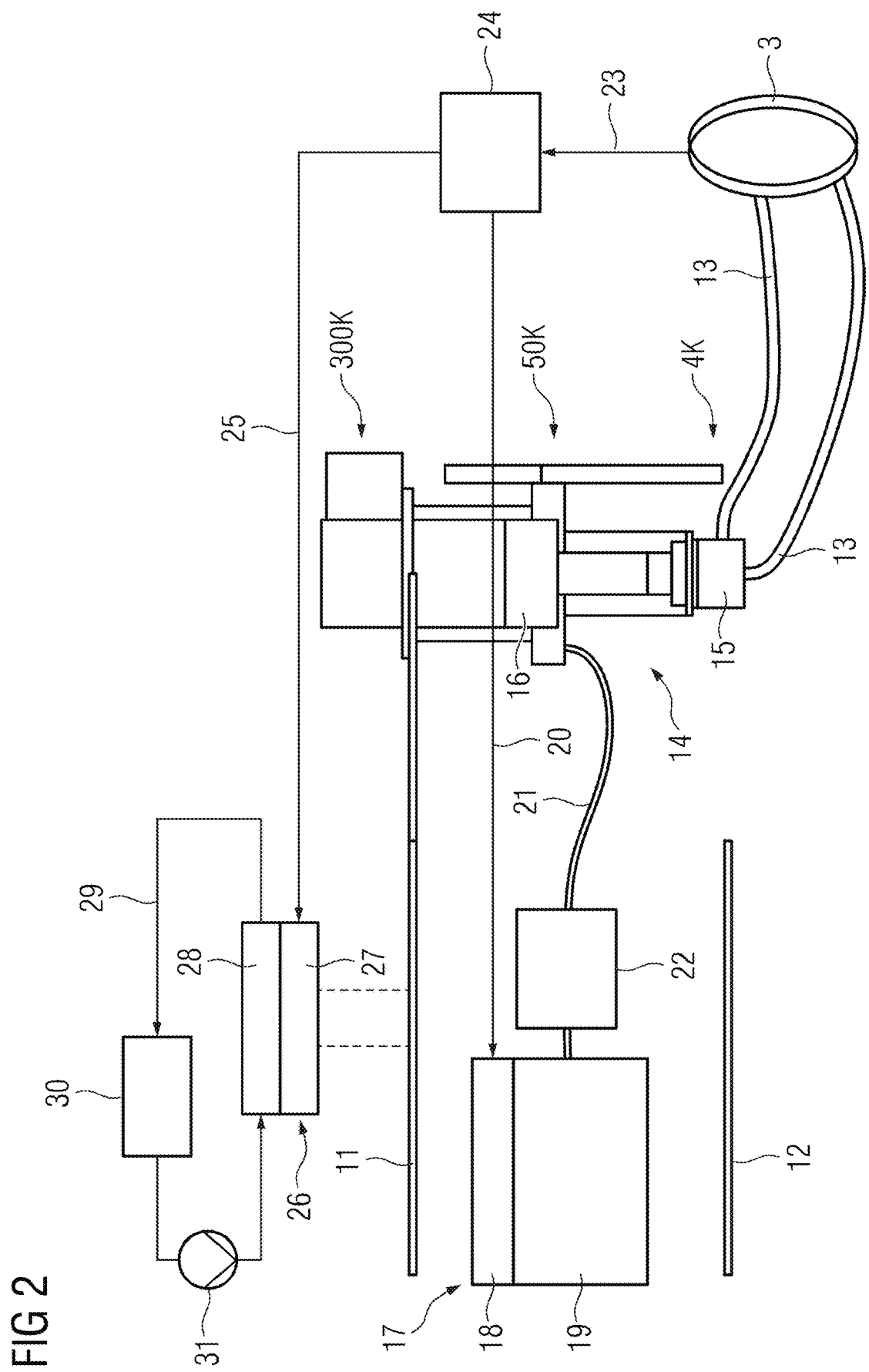
FIG. 2 illustrates a schematic view of components of an example cooling system for cooling superconductive magnetic coils of a magnetic resonance system, in accordance with one or more embodiments of the present disclosure.

In accordance with FIG. 2, the MRT system 1 has a cooling system configured to cool the superconducting magnetic coils 3 of the field magnet to temperatures at which the magnetic coils are superconductive.

In the present example, the cooling system of the magnetic resonance system has essentially three temperature zones. The first temperature zone is identified in FIG. 2 by 300 K and is symbolized in approximately the ambient temperature. This outer temperature zone is also located in an outer vacuum chamber 11. The superconducting magnetic coils 3 of the field magnet, which are surrounded by a cryoshield 12, are located within the outer vacuum chamber 11. An average temperature zone which is identified in FIG. 2 by 50 K is located between the cryoshield 12 and the outer vacuum chamber 11. Typically, the temperature there is in the range of 40 to 70 K.

The innermost temperature zone, which is identified in FIG. 2 by 4 K, is located within the cryoshield 12 in which the magnetic coils 3 are located. A helium cooling circuit 13 for cooling the magnetic coils 3 is located in this temperature zone.

The cooling is essentially achieved by a cold head 14. The cold head 14 transports the heat from the helium cooling circuit 13 within the cryoshield 12 outwards through the outer vacuum chamber 11. For this purpose, the cold head 14 has a second cooling stage 15, which is connected to the helium cooling circuit 13. A first cooling stage 16 of the cold head 14 is located in the vacuum between the outer vacuum chamber 11 and the cryoshield 12. It is possible using this first cooling stage 16 to cool down to 50 K, for example.

A first load facility 17 (also referred to herein simply as a load) is also located within the outer vacuum chamber 11. The first load facility 17 represents an electrical load and has, for example, a diode arrangement 18 that converts electrical current into heat. In order to be able to dissipate heat, the first diode arrangement 18 is fastened to a first heat storage unit 19 and connected thereto in terms of conducting heat. The first load facility 17 can also be fastened to the outer vacuum chamber 11 so as to provide mechanical support and heat dissipation.

When the main magnet is ramped down by way of ramping down the superconducting magnetic coils 3 (i.e. run down), the first load facility 17 can receive current from the superconducting magnetic coils 3 via a first current line 20. During the conversion of the current by the first diode arrangement 18 (alternatively or additionally also a resistor arrangement) heat is produced which is dissipated via the first heat storage facility 19 which is connected to a first cooling circuit 21.

The first cooling circuit 21 is connected to the first cooling stage 16 of the cold head 14. Optionally, the first cooling circuit 21 can have a thermal switch 22 with which the first cooling circuit 21 can be controlled or regulated. The first cooling circuit 21 can also be designed alternatively as a simple thermal conductor.

During ramping down, the current initially flows from the superconducting magnetic coils 3 via a main line 23 to a switching facility (also referred to herein as an electrical switch) 24, which can be superconducting. The switch 24 directs the current into the first current line 20 or a second current line 25. The second current line 25 leads from the outer vacuum chamber 11 to a second load facility 26. It is consequently possible, using the switch 24, to send the current of the superconducting magnetic coils 3 either to the first load facility 17 or to the second load facility 26, where appropriate, however, also to both, to be thermally converted. The second load facility 26 has a second diode arrangement 27, which receives the current from the second current line 25. Alternatively or in addition to the second diode arrangement, the second load facility can have a second resistor arrangement. In addition, the second load facility 26 has a second heat storage unit 28. The second heat storage unit 28 can be provided as a cooling plate. In an embodiment, the second heat storage unit 28 is connected to a second cooling circuit 29 having a separate heat exchanger 30 and pump 31.

Due to its complexity, the illustrated cooling system may be susceptible to faults, which can also occur with varying frequency. Thus, for example, the following operating situations occur:

Operating situation 1: The water cooling (not illustrated in FIG. 2; cools the cold head 14) of the system fails, owing to a fault in the cooling system (for example a pump) or due to a power failure without an uninterruptable power supply (UPS) buffer. This means that the magnet cooling also fails and, at the same time, the heat from the first load facility 17 (RDL) cannot be removed when the system is run down, since the cold head 14 is not running due to the lack of water circulation. The energy of the magnet or the magnetic coils 3 must be completely deposited in the first load facility 17 (for example at 50 K) and must be removed from it again during re-cooling.

Operating situation 2: The magnetic cooling fails due to a failure of the compressor (MREF) of the primary cooling apparatus not illustrated in FIG. 2, which is connected to the cold head 14. However, the water cooling in the second cooling circuit 29 continues to run through the second load facility 26. The energy of the superconducting magnetic coils 3 can be dissipated by way of the water circulation and the second load facility 26 does not have to store all the energy. All the energy is deposited outside the actual magnetic resonance system. It is not necessary to re-cool the first load facility 17 for faults in which the compressor or cold head 14 fails but the water cooling continues to run.

Compared to conventional "run down loads" (load facilities), a significant reduction in size and space requirements on the outside of the magnetic resonance system can be achieved by integrating the first load facility 17 into the outer vacuum chamber 11. The first load facility 17 can be thermally coupled to the first stage of the cold head 14, which in thermal equilibrium reaches a temperature of approx. 40 to 70 K in thermal equilibrium. The switch 24 of the magnetic resonance system can be opened in such a way that the current from the main magnetic field is conducted via the diode/resistor array 18 or 27, thereby converting the energy of the static magnetic field into heat. The diode array 18 or 27 sits on a respective heat storage unit 19, 28, which temporarily stores this energy until it is dissipated. The energy can be dissipated using air, water, or other cooling measures. For instance, heat pipes can be used.

As mentioned, the first load facility 17 is arranged in the inside of the outer vacuum chamber 11. The first load facility 17 is thermally connected to the first stage of the cold head 14. With respect to the feasibility, it is possible to estimate that the first stage of the cold head 14 generates approximately 60 W of cooling power in the case of approximately 70 K temperature. In order to draw 12 MJ energy from the first load facility 17 at 60 W power, it takes 12 MJ/60/3600 s=55 h (without consideration of the temperature dependency of the heat capacity and without taking into consideration that the cold head 14 has more cooling power in the case of a higher temperature). This would make the magnet operational again much more quickly after a run-down or ramp-down than when quenched. A significant decrease in the heat capacity of aluminum only begins at approximately 100 to 150 K. This means that a dT=140 K with full heat capacity is available for an increase to 290 K. The mass of the heat storage unit 19 made of aluminum could therefore be:

$$12 MJ/(0,8 kJ/K/W)/140 K = 100 kg.$$

In fact, the buffer or the heat storage unit can be even smaller, since it was assumed in the calculation that the load facility has no heat capacity between 70 and 150 K.

The load facilities or their heat storage units can be produced using aluminum, copper, steel, or other suitable materials that have a high heat capacity. For instance, it is also possible to use liquid nitrogen or helium, and combinations of all the mentioned materials.

The first load facility 17 is optionally connected to the cold head 14 via the thermal switch 22. The thermal switch 22 may be controlled on or by a magnetic electronic system, and may additionally or alternatively be controlled via the control and computing system 9, for example. As mentioned, this allows switching on or off or intermediate states of the heat transfer.

In this case, a second external load facility 26 is provided in addition to the first load facility inside the outer vacuum chamber 11, which can be cooled to approx. 50 K. This second load facility 26 can be selected to be very small (for example only a few kilogram, less than 1 to 30 kilograms, etc.). This second load facility 26 may also have a resistor and/or diode arrangement 27, and is used primarily for thermal dissipation to a cooling medium (for example water, air, etc.), which is flowing past it. In an embodiment, a cooling plate having a diode pack is sufficient as a second load facility.

During the operation, the central control unit (e.g. the control and computing system 9) of the magnetic resonance system 1 may, in the event of a necessary running down recognize, for example, whether the water circulation of the primary cooling apparatus (not illustrated in FIG. 2) is still functioning or not. It is thus possible to differentiate between the two operating situations 1 and 2 illustrated above. In the event of a fault as in the operating situation 1, the central control unit of the magnetic resonance system activates the first load facility. In the event of a fault as in the operating situation 2, the second load facility is activated. This increases the availability of the system in an advantageous manner, since the long re-cooling time of approx. 55 h is only necessary in the case of operating situation 1. In the case of the operating situation 2, the main magnet is still cold and can be ramped up again immediately once the fault has been rectified.

The thermal switch 22 renders it possible, for example when the main magnet is cooled down, to first cool down all critical components that allow the main magnet to be ramped up and only to cool down the first load facility afterwards. The probability of a fault occurring precisely during these 50 h, which would result in the first load facility being required, is tolerable. The thermal switch 22 may also remain mainly open during the operation. Alternatively, the thermal switch 22 may be opened during a running down of the main magnet if this appears advantageous.

So-called hybrid cryogenic heat storage units can be used. In one variant, liquid nitrogen can be used as a storage material. The corresponding hybrid heat storage unit can be made from a metal sheath and a content which achieves a phase transition during warming. In the present case, the filling comprises liquid nitrogen. With a heat capacity of approx. 2 KJ/kg/K, this only has a slightly higher heat capacity than aluminum, for example, with 0.88 KJ/kg/K. In addition, liquid nitrogen requires an energy of 200 KJ/kg for the phase transition. In the case of 10 kg of nitrogen, a volume of 20 m$^3$ would be created at room temperature. At 200 bar pressure, this could be achieved in a 200l vessel. However, at 2000 kJ, this only provides just under 20 percent of the energy storage required for a 3 T magnet.

In an alternative design, it is also conceivable that solid nitrogen is used as a cryogenic cold storage facility. This means that both phase transitions at approx. 63 K and 77 K can be used. That is a further 25 KJ/kg/K for nitrogen.

In the case of an alternative variant, helium is used as a cryogenic heat storage facility. The magnetic resonance system generally requires a pressure vessel anyway to store the helium in the event of quenching or heating of the entire magnet. Today, the pressure vessel is also located outside the outer vacuum chamber (OVC), and could also be placed in the space between the OVC and the cryoshield. This can save additional space outside the OVC, and the line lengths and line lengths and feedthroughs of the helium lines through the OVC can be omitted. This pressure vessel must be provided (at 20 to 200 bar) with very thick walls. It is therefore feasible that the pressure vessel is used simultaneously as a hybrid RDL. In addition to the higher heat capacity of helium compared to nitrogen, helium also has the advantage that synergies can be utilized, since the pressure vessel can take on two functions (store helium and store heat in the event of a controlled ramp-down).

The cooling system was described above with two load facilities 17 and 26 by way of example and not limitation. The embodiments as described herein may also be achieved with only the first load facility 17 inside the vacuum chamber 11. Optionally, a design with both load facilities is possible.

The particular advantage of the cryo-technical arrangement of the load facility or the heat storage facility for running down "dry magnets" in accordance with the embodiments of the disclosure lies in the small amount of space required, lower costs, and a greater integration of the load facility (RDL) into the magnetic resonance system and, where appropriate, the use of synergies between the load facility and the helium storage facility.

The various components described herein may be referred to as "units." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, as applicable and relevant, may alternatively be referred to herein as "circuitry," "controllers," "processors," or "processing circuitry," or alternatively as noted herein.

What is claimed is:

1. A magnetic resonance system, comprising:
a main magnet including superconducting magnetic coils;
an outer vacuum chamber in which the main magnet is arranged;
a first load configured to ramp down the main magnet via an introduction of electrical current from the superconducting magnetic coils of the main magnet into the first load, and
a current line that is separate from the first load,
wherein the current line is configured to direct the electrical current from the superconducting magnetic coils of the main magnet into the first load to ramp down the main magnet, and
wherein the first load is arranged at least partially within the outer vacuum chamber.

2. The magnetic resonance system as claimed in claim 1, wherein the first load is connected to a cold head via a thermal conductor, and
wherein the cold head is configured to cool the main magnet.

3. The magnetic resonance system as claimed in claim 2, wherein the main magnet is arranged in a cryoshield within the outer vacuum chamber, and
wherein the cold head protrudes through the outer vacuum chamber and the cryoshield.

4. The magnetic resonance system as claimed in claim 3, wherein the first load is connected between the outer vacuum chamber and the cryoshield, and
wherein the first load is connected to the cold head via the thermal conductor.

5. The magnetic resonance system as claimed in claim 2, wherein the thermal conductor comprises a thermal switch, and
wherein the thermal switch is configured to control a heat dissipation of the thermal conductor.

6. The magnetic resonance system as claimed in claim 1, wherein the first load comprises:
a first diode arrangement and/or a first resistor arrangement; and
a first heat storage unit configured to receive thermal energy from the first diode arrangement and/or the first resistor arrangement.

7. The magnetic resonance system as claimed in claim 1, further comprising:
a second load arranged outside the outer vacuum chamber,
wherein the second load is configured to ramp down the main magnet via an introduction of electrical current from the main magnet into the second load.

8. The magnetic resonance system as claimed in claim 7, wherein the first load comprises:
a first diode arrangement and/or a first resistor arrangement; and
a first heat storage unit configured to receive thermal energy from the first diode arrangement and/or the first resistor arrangement, and
wherein the second load comprises:
a second diode arrangement and/or second resistor arrangement; and
a second heat storage unit configured to receive thermal energy from the second diode arrangement and/or the second resistor arrangement,
wherein the second heat storage unit is connected to a separate cooling system than the first heat storage unit.

9. The magnetic resonance system as claimed in claim 7, wherein the first load comprises:
a first diode arrangement and/or a first resistor arrangement; and
a first heat storage unit configured to receive thermal energy from the first diode arrangement and/or the first resistor arrangement,
wherein the first and the second load are connected via a switch to the superconducting magnetic coils of the main magnet, and
wherein current of the superconducting magnetic coils is selectively introduced into the first and/or the second load based upon a state of the switch.

10. The magnetic resonance system as claimed in claim 6, wherein the first heat storage unit comprises a material that, in a predetermined temperature range within the outer vacuum chamber, has at least one phase transition.

11. The magnetic resonance system as claimed in claim 1, wherein the first load is fastened directly to the outer vacuum chamber.

12. The magnetic resonance system as claimed in claim 1, further comprising:
a cooling circuit within the outer vacuum chamber,
wherein the first load is connected to the cooling circuit to provide cooling.

13. The magnetic resonance system as claimed in claim 12, further comprising:
a controller configured to set the cooling circuit into operation in response to the first load being used for ramping down the main magnet.

14. The magnetic resonance system as claimed in claim 1, further comprising:
a switch configured to introduce the electrical current from the superconducting magnetic coils of the main magnet into the first load to ramp down the main magnet.

15. The magnetic resonance system as claimed in claim 1, wherein the first load comprises:
a first diode arrangement; and
a first heat storage unit configured to receive thermal energy from the first diode arrangement.

16. The magnetic resonance system as claimed in claim 2, further comprising:
a second load arranged outside the outer vacuum chamber, the second load being configured to ramp down the main magnet via an introduction of electrical current from the main magnet into the second load,
wherein the first and the second load are connected via a switch to the superconducting magnetic coils of the main magnet, and
wherein, when water cooling of the cold head fails, current of the superconducting magnetic coils is introduced into the first load.

17. The magnetic resonance system as claimed in claim 2, further comprising:
a second load arranged outside the outer vacuum chamber, the second load being configured to ramp down the main magnet via an introduction of electrical current from the main magnet into the second load,
wherein the first and the second load are connected via a switch to the superconducting magnetic coils of the main magnet, and
wherein, when water cooling of the cold head fails, current of the superconducting magnetic coils is introduced into the second load.

18. The magnetic resonance system as claimed in claim 2, further comprising:

a cooling circuit within the outer vacuum chamber, wherein:
the first load is connected to the cooling circuit to provide cooling,
the thermal conductor comprises a thermal switch configured to control the cooling circuit to facilitate, when the superconducting coils of the main magnet are in a cooled state, a cooling down of components that enable the superconducting coils of the main magnet to be ramped up prior to cooling the first load.

19. A method for operating a magnetic resonance system, the method comprising:
providing a main magnet including superconducting magnetic coils, an outer vacuum chamber in which the main magnet is arranged, and a first load configured to ramp down the main magnet;
providing a current line that is separate from the first load; and
ramping down the main magnet by directing, via the current line, an electrical current from the superconducting magnetic coils of the main magnet into the first load,
wherein the first load is arranged at least partially within the outer vacuum chamber.

* * * * *